May 31, 1966     T. M. MERRIMAN ETAL     3,253,859

SAFETY PAD

Filed March 20, 1964

*INVENTORS*
TOM M. MERRIMAN
RAY M. JOHNSON
BY
*Knox & Knox*

United States Patent Office 3,253,859
Patented May 31, 1966

3,253,859
SAFETY PAD
Tom M. Merriman, 3070 Monarch, San Diego, Calif. 92123, and Ray M. Johnson, 8427 Harwell Drive, San Diego, Calif. 92119
Filed Mar. 20, 1964, Ser. No. 353,348
2 Claims. (Cl. 297—397)

This invention relates generally to safety devices and particularly to a headstop for preventing neck injuries in automotive vehicles.

Background

Frequently, drivers and passengers in automotive vehicles suffer painful neck injuries when the vehicles they are riding in are struck from the rear. Such injuries which are caused by the head being snapped violently backward while the body is restrained by the seat back, could be prevented if the head also were restrained.

Accordingly, the instant invention is a padded headstop for attachment to seat backs in automobiles, the headstop extending above the seat back at the same level as the head of a vehicle driver or passenger.

Objects

It is a principal object of this invention to provide a headstop for installation in automotive vehicles that protects the driver or a passenger from neck injury during a rear end collision.

It is another object of this invention to provide a headstop that may be adjusted in height above the back of a vehicle seat.

It is a further object of this invention to provide a multiple headstop assembly that protects the driver and passengers from neck injury during a rear end collision.

With these and other objects definitely in view, this invention consists in the novel combination and arrangement of elements as will be hereinafter fully described in the specification, particularly pointed out in the claims, and illustrated in the drawings that form a material part of this disclosure, and in which:

Similar characters of reference indicate similar or identical elements and portions throughout the specification and the views of the drawing.

Detailed description

Figure 1:
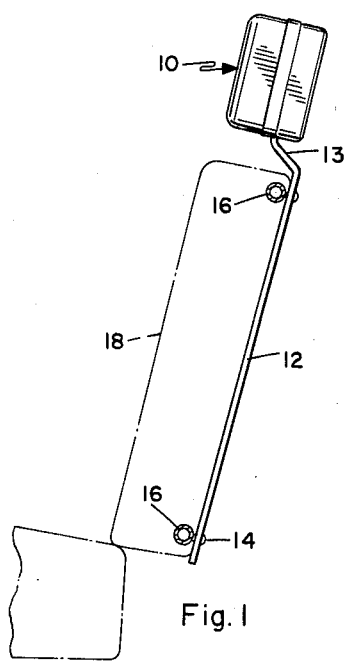
FIGURE 1 is a side elevation view of one embodiment of the headstop shown attached to a vehicle seat back.

Referring to FIGURE 1, a padded headstop 10 is secured to an elongated strap-like member 12. Member 12 is secured by bolts 14 to structural frame 16 of seat back 18, said seat back being typical of those installed in automotive vehicles. Member 12 is dimensioned to extend from a lower edge portion to an upper edge portion of a vehicle seat back, adjacent the rear face thereof, and member 12 has an upwardly extended part including a forwardly offset portion 13 disposed above the seat back and upon which the headstop 10 is secured and whereby the headstop 10 is positioned above the seat back 18 as shown, this being the preferred position for stopping the seat occupant's head from being snapped back with possible neck injury in case of a rear end collision. Strap-like member 12 is composed of resilient material such as cold rolled steel or other material of sufficient strength to withstand a considerable impact while at the same time providing resiliency without excessive springiness. Member 12 is purposely attached to the structural frame of the seat back 18 at only two points, one near the top and the other near the bottom of the seat back, as clearly indicated in FIG. 1, by bolts 14, thus permitting the central portion of member 12 to bow forwardly and provide additional resiliency when headstop 10 is pushed backward.

Figure 2:
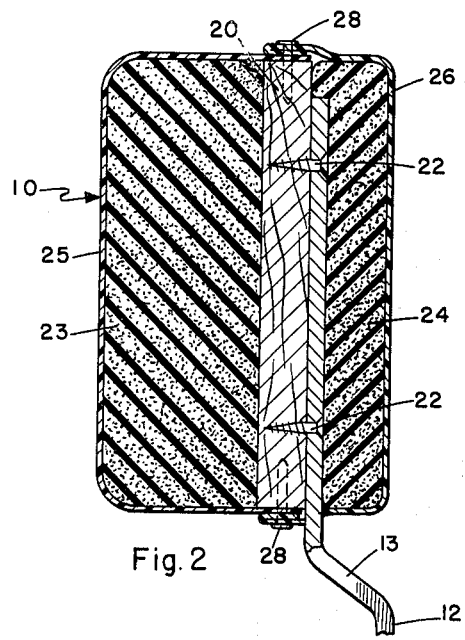
FIGURE 2 is an enlarged sectional view showing structural details of the headstop.

FIGURE 2 shows more clearly the structural details of headstop 10. A base board 20 of plywood or the like is attached to strap-like member 12 by woodscrews 22 or the equivalent. Pads 23 and 24 of polyfoam or other resilient material are provided on the front and rear sides of the base board 20 and are covered by flexible plastic or leather sections 25 and 26 and secured to the front and back of base board 20 by upholstery nails 28. The front padding provides head protection for the occupant of the seat to which headstop 10 is attached, while the back padding protects occupants of the rear seat against injury from being thrown forward against headstop 10.

Figure 3:
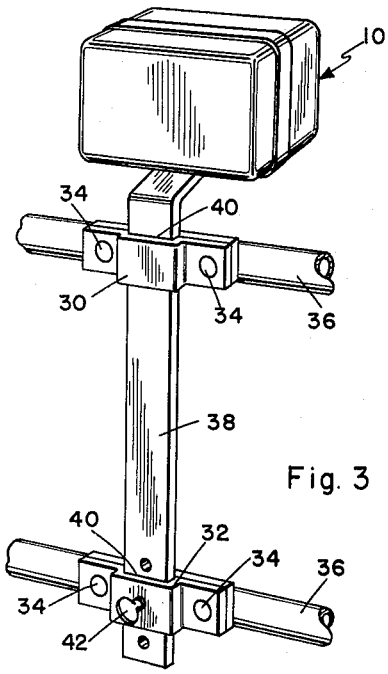
FIGURE 3 is a rear elevation view showing adjustment features of a second embodiment of the headstop.

Another embodiment of the instant invention having means for adjusting the height of headstop 10 is illustrated in FIGURE 3. Here brackets 30 and 32 are secured by rivets or bolts 34 to seat back structural frame 36. Strap-like member 38 is slidably engaged in U-shaped slots 40 in brackets 30 and 32. After adjustment for height, member 38 is secured rigidly in place by set screw 42, which engages bracket 32 and member 38. The structure of headstop 10 is the same as shown in FIGURE 2.

Figure 4:
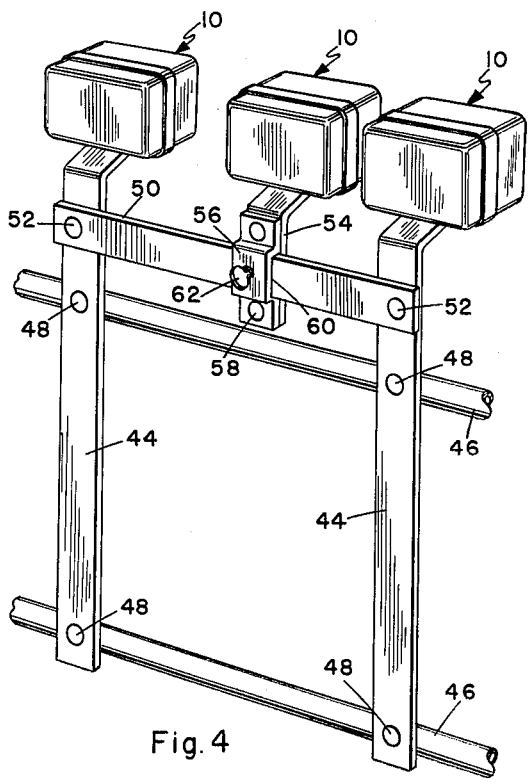
FIGURE 4 is a rear elevation view showing a multiple assembly of headstops.

A multiple assembly of headstops 10, each similar to those described, for protecting the driver and passengers in a vehicle front seat or the passengers in a rear seat, is shown in FIGURE 4. Vertically disposed strap-like members 44 are secured to seat back structural frame 46 by rivets or bolts 48. A horizontally disposed strap 50 is attached to members 44 by rivets or bolts 52. A short strap 54 is slidably attached to strap 50 by bracket 56 and rivets or bolts 58, bracket 50 having a U-shaped slot 60 clasping strap 50. After adjustment for horizontal position, the center headstop 10 is secured rigidly in place by set screw 62, which engages bracket 56 and presses tightly against strap 50.

From the foregoing description, it is apparent that the instant invention is a rugged and reliable safety device that may be easily installed in automotive vehicles for protection of both driver and passengers against neck injury.

It is understood that minor variation from the forms of the invention disclosed herein may be made without departure from the spirit and scope of the invention, and that the specification and drawing are to be considered as merely illustrative rather than limiting.

We claim:
1. A recoil safety device for the back of a vehicle seat comprising:
   a pair of resilient strap-like vertically disposed members attached to said back and extending upward above said back;
   a pair of padded headstops secured to the upward extending portion of said members above said back in positions to restrain the head from snapping backward;
   a resilient strap-like horizontally disposed member connecting said vertically disposed members below said headstops;
   an upwardly extending strap-like member slidably engaging said horizontally disposed member; and
   a padded headstop secured to the upwardly extending portion of the last mentioned member in a position horizontally aligned with said pair of padded headstops.

2. Apparatus according to claim 1 including a set screw engaging the last mentioned member and said horizontally disposed member.

References Cited by the Examiner

UNITED STATES PATENTS

| | | | |
|---|---|---|---|
| 490,541 | 1/1893 | Case | 297—405 |
| 937,343 | 10/1909 | Wallace | 297—407 |
| 1,234,571 | 6/1917 | Robideau | 297—396 |
| 2,020,573 | 11/1935 | Pumphrey | 297—396 |
| 2,627,903 | 2/1953 | Stevenson | 297—385 |
| 2,661,050 | 12/1953 | Felter | 297—391 |
| 2,765,840 | 10/1956 | Robert et al. | 297—403 |
| 3,063,751 | 11/1962 | Hatch | 297—410 |

FRANK B. SHERRY, *Primary Examiner.*

C. A. NUNBERG, *Assistant Examiner.*